United States Patent Office 2,808,362
Patented Oct. 1, 1957

2,808,362

PREPARATION OF HYALURONIDASE

William M. Thompson, Chicago, Myron D. Grossnickle, Homewood, and Roland J. Seidel, Des Plaines, Ill., assignors to Armour and Company, Chicago, Ill., a corporation of Illinois No Drawing. Application May 2, 1952,
Serial No. 285,792

13 Claims. (Cl. 195—66)

This invention relates to the preparation of hyaluronidase, and more particularly to a method of preparing pharmaceutical hyaluronidase.

Hyaluronidase was discovered in 1928 by Dr. F. Duran-Reynals during the study of the effect of testicular extracts on vaccinial infections. It was originally known as the "spreading factor" because of its observed ability to increase the permeability of tissue in vivo. The name hyaluronidase was later applied because this enzyme (or enzymes) had a marked capacity to hydrolyze hyaluronic acid, one of the polysaccharides comprising intercellar ground substance of the mesenchyme. In other words, one of the characteristics of hyaluronidase is that it reduces the viscosity of hyaluronic acid. However, recent studies indicate that hyaluronidase may be composed of more than one active principle. One active principle possibly functions as the "spreading factor" while another active principle functions as the "viscosity reducing factor." The pure enzyme or enzymes comprising hyaluronidase have not been isolated, and therefore the question of whether hyaluronidase consists of more than one enzyme has not received a definitive answer. For the purpose of the present application hyaluronidase is understood to be the active principle or principles of enzymatic nature found in testicular extracts and elsewhere characterized by hydrolyzing hyaluronic acid and also by increasing the permeability of tissue in vivo.

In recent years considerable interest has developed in using hyaluronidase as an adjuvant to achieve more effective and beneficial application of therapeutic agents. It has been found that when hyaluronidase is added to injectable solutions, it increases the rate of penetration and absorption of the therapeutic agent. It has also been found to have value in the treatment of human infertility. More recently, it has been discovered that hyaluronidase has value in preventing the development of adhesions after abdominal surgery. Because of these uses and others which have been discovered, there is at present a considerable demand for pharmaceutical hyaluronidase.

Hyaluronidase is obtained commercially mainly from the testes of mammals. It is also present in certain other mammalian glands and tissues, such as the prostate gland, and the spleen. The enzyme is extracted into water from comminuted testicular tissue. In carrying out the aqueous extraction of hyaluronidase, it has been found desirable to adjust the pH of the water to about 4.5 to 4.7, or to use .1 N acetic acid, which results in the desired pH. Other pH's above and below this range can be employed, but are not believed to be as advantageous as pH's within the specified range. The crude aqueous extract is not sufficiently pure for pharmaceutical use. The extract contains large quantities of inert (relative to the desired activity) protein contaminants.

The concentration or potency of hyaluronidase preparations can be conveniently expressed in Dorfman turbidity reducing units (TRU). The standard test procedure for determining the concentration in terms of TRU is set out in Dorfman and Ott, J. Biol. Chem. 172, 367–375 (1948).

The purity index of a hyaluronidase preparation is generally given as turbidity reducing units per milligram of nitrogen (TRU/mg. N). The higher the purity index, the lower the percent of inert protein contaminants contained in the preparation. The purity index of an acidified water extract of testicular tissue varies with the extraction procedure and kind of testicular tissue. With beef testes, the most important commercial source of hyaluronidase, extraction with .1 N acetic acid usually gives an extract having a purity index of between about 150 to 250 TRU/mg. N. For pharmaceutical use, the purity index of the hyaluronidase preparation should be at least 600 TRU/mg. N and preferably 800 to 1200 TRU/mg. N. Therefore, it can be seen that it is necessary to purify the crude hyaluronidase extracts.

Efforts to purify aqueous extracts of hyaluronidase were initiated soon after its discovery. It was found that a 50% saturation of ammonium sulfate precipitated an inert protein fraction, which contained very little of the active principle. It was also found that 100% saturation of ammonium sulfate precipitated a protein fraction which contained substantially all of the active principle. These findings indicated that purification of the aqueous extracts could be obtained by carrying it through an ammonium sulfate fractionation in which an inert protein fraction was first removed, and then a protein fraction containing the hyaluronidase material was removed. In fact, this purification technique was accepted as standard procedure, and attempts to find other techniques for purifying the aqueous extracts have not met with much success. For example, both lead acetate and sodium chloride fractionations of the water extract have been found to give unsatisfactory results. The ammonium sulfate fractionation has been the subject of some refinements in technique in the pH's employed and the precise concentrations of ammonium sulfate. For example, one process precipitates the hyaluronidase-inactive fraction between 25 to 30% ammonium sulfate saturation, and the hyaluronidase-active fraction between 60 to 80% saturation.

The use of an ammonium sulfate fractionation to purify aqueous hyaluronidase extracts has a number of disadvantages, the most obvious of which is that large amounts of ammonium sulfate are required to carry out the fractionation, and the ammonium sulfate is not readily recovered for re-use in the process. Thus, the use of ammonium sulfate increases the cost of preparing pharmaceutical hyaluronidase. Further, the ammonium sulfate fractionation requires considerable time, since the ammonium sulfate treated solutions must be allowed to stand for a number of hours to precipitate the protein fractions. A still further disadvantage of the ammonium sulfate fractionation procedure is that the hyaluronidase preparation obtained contains large amounts of ammonium sulfate, which must be removed before the preparation is ready for pharmaceutical use. The most frequent way of removing the ammonium sulfate has been by using dialysis, but the dialysis must be carefully controlled because a rapid change in ionic strength occurring during the removal of the ammonium sulfate has a tendency to denature the hyaluronidase. Therefore, this step is relatively time consuming since the dialysis must be carried out rather slowly. A still further disadvantage of the ammonium sulfate fractionation is that the potency of the product varies widely, and is not readily subject to control.

The ideal process for preparing hyaluronidase from aqueous testicular extracts would involve a single purifying step in which no reagents are required, and which results in the production of a hyaluronidase preparation of relatively uniform concentration and purity so that it can be vialed directly.

It is therefore a general object of the present invention to provide a process for preparing pharmaceutical hyaluronidase from aqueous testicular extracts in a minimum number of steps and at a minimum cost. More specifically, it is an object of this invention to provide a process of the character indicated in which the aqueous extract is purified in a single step without the use of any reagents, such as ammonium sulfate. It is a still further object of this invention to provide a one-step portion for purifying aqueous extracts of hyaluronidase which results in hyaluronidase preparations of relatively uniform concentration and purity. Further objects and advantages will appear as the specification proceeds.

One phase of the present invention is based on the discovery that a high degree of purification of a crude aqueous extract of hyaluronidase can be obtained by dialyzing the crude aqueous extract against water. More specifically, it has been found that the simple step of dialyzing an unpurified aqueous extract of hyaluronidase against water results in at least as great a purification of the extract as is obtained by subjecting the unpurified extract to an ammonium sulfate fractionation, and then removing the residual sulfate from the preparation. Other discoveries underlying the present invention will become apparent as the specification proceeds.

Broadly, hyaluronidase-bearing tissue can be used as a starting material in the present process. The preferred starting material, however, can be designated as mammalian testicular tissue. Because of their availability, it is preferred to employ the testes of cattle, hogs, and sheep. In particular, beef testes give excellent results.

When the testes of mammals are employed as a starting material, as preferred, it is desirable to prepare the testicular tissue for extraction. Either fresh or frozen testicular tissue can be employed, but it has been found that quick frozen testicular tissue stored at temperatures at least below —5° C. and preferably at about —15 to —60° C. is the easiest and most satisfactory material to process. Preferably, the frozen glands are decapsulated. One suitable procedure for accomplishing this result is to immerse the frozen glands in hot water (150 to 212° F.), which causes the outer membrane to separate. The capsule can then be slit on one side and peeled off. The decapsulated glands are then ground or hashed. Preferably, they are finely divided to expose a large surface area. This can best be accomplished by grinding them in a frozen state with Dry Ice to a small mesh size.

The comminuted testicular tissue is then extracted with water to obtain an aqueous extract of hyaluronidase. The acidity of the water can be adjusted substantially as taught by the prior art, that is, the pH can be between about 4.5 to 4.7, or .1 N acetic acid can be employed. Other acids can be employed by adjusting the pH to the desired range. The temperature of the extraction can also be substantially the same as taught by the prior art. For example, temperatures below about 5° C. are preferable, although temperatures up to as high as 25° C. can be employed with some success. On the basis of the experimental work leading to the present invention, however, it is believed that temperatures around 0° C. are the most advantageous. When the temperature of the water is maintained around 0° C. there is less tendency for denaturation of the enzyme to occur. Also, temperatures around 0° C. permit somewhat lower pH's to be used, for example, pH's from about 4 to 4.5 can satisfactorily be employed.

A relatively wide range of proportions of solvent to tissue can be employed with fair success. However, the experimental work leading to the present invention, contrary to the general teachings in the field, has indicated that it is highly advantageous to employ minimum volumes. It was formerly believed that when volumes as low as equal parts of tissue to water were employed that greatly reduced yields would be obtained. Actually, however, this has not proven to be the case, since the work leading to the present invention indicates that complete extraction of the hyaluronidase can readily be obtained at very low volumes. Further, it has been discovered that the use of weight or volume ratios of tissue to extracting solvent in the order of 1 to 1 greatly reduces the extraction of inert contaminants, while at the same time allowing substantially all of the active principle to be extracted. For example, at a 3 to 1 ratio of solvent to tissue as compared with a 1 to 1 ratio, 15% additional activity will be extracted with the greater amount of solvent, but 30% additional total solids will be extracted, resulting in the production of a hyaluronidase preparation with 85% of the purity of the preparation obtained at the 1 to 1 ratio. Therefore, for the purposes of the present invention, it is preferred to use extraction volumes, or more precisely ratios by weight of the order of ½ to 2 parts by weight of extracting solvent to each part by weight of tissue. However, ratios as high as 5 to 10 parts by weight of aqueous solvent to each part by weight of tissue can be used with fair success. It should also be kept in mind that the testicular material itself is largely liquid, and that the liquid is mostly water. The limits expressed are not intended to include the liquid portion of the testicular material, but instead refer to the amount of aqueous extracting solvent added to the tissue.

According to the prior art teachings, it was generally believed that a relatively long time of contact is required to completely extract the hyaluronidase. A minimum extraction time was considered to be "overnight extraction" (about 12 hours). The experimental work leading to the present invention has indicated that the extraction of the hyaluronidase is very rapid, and that the extraction may be substantially complete in as short a time as 20 to 30 minutes. Longer times of contact tend to increase the amount of inert contaminants extracted without correspondingly increasing the amount of hyaluronidase extracted. In general, extraction times from about ½ to 4 hours are desirable, and an extraction time of around 2 hours has been found to give excellent results. However, extraction times of up to 24 to 48 hours can be employed in the prior practice. Long extraction times are not believed to have any significant advantage in increasing the yield of hyaluronidase. For example, in a typical experiment a ½ hour extraction produced a concentration of hyaluronidase in the extract of 313 TRU/ml., while continuing the same extraction for 24 hours only increased the concentration to 328 TRU/ml.

After the completion of the extraction, the tissue residue can be separated from the aqueous extract by any suitable means. Centrifugation can advantageously be employed to achieve this separation. Preferably the separation is carried out in the cold at approximately the same temperatures as employed for the extraction, that is, preferably below 5° C.

The crude aqueous extracts of hyaluronidase thus obtained is then dialyzed against water for the purpose of purifying the hyaluronidase preparation. It has been discovered that this dialysis can be carried out without denaturing the hyaluronidase even though a buffer salt is not employed. However, buffer salts can be used if desired. It is preferred however to subject the aqueous extract to dialysis against substantially pure water. However, it is not necessary to employ distilled water, since tap water is satisfactory. The temperature conditions during the dialysis step are preferably the same as those during the preceding steps. More specifically, temperatures below about 5° C. are preferred, although higher temperatures can also be used. The dialyzer can be of the conventional type of semi-permeable membrane which retains molecules of the order of size of protein molecules, while allowing water molecules and inorganic salt ions to pass through the membrane. For example, excellent results can be obtained by using cellophane membranes.

The exact mechanism by which the dialysis step achieves the purification of the aqueous extract is not fully understood. However, it is believed that the first thing to occur is that the body salts (inorganic salts such as sodium chloride, potassium chloride, potassium carbonate, and sodium carbonate) diffuse through the membrane into the surrounding water. As this migration of the body salts occurs, the salt concentration of the aqueous extract within the membrane is progressively reduced. As the dialysis proceeds, a precipitate gradually forms within the membrane. The precipitate thus obtained has been found to contain the bulk of the salt-soluble proteins in the extract, but very little of the active principle. As much as ⅔ or more by weight of the total protein content in the extract has been found to be precipitated by this dialysis step without any substantial loss of hyaluronidase. Thus, it can readily be seen that this simple dialysis step permits a great purification of the aqueous extract. More specifically, it has been found that the purity index of the crude extract can be increased from an original value of around 150 to 250 TRU/mg. N to 800 to 1200 TRU/mg. N. Purities of better than 1000 TRU/mg. N are regularly obtained from crude extracts of purities around 200 TRU/mg. N.

On the completion of the dialysis step, the dialyzate is discarded, and the residue solution within the membrane is separated from the precipitate of inert protein material within the membrane. This separation can be carried out by any suitable procedure, such as filtration, centrifugation, etc.

The purified aqueous extract thus obtained is ready for pharmaceutical use, and can be vialed directly. For example, it can be sterilized by filtration (Seitz-filtered into sterile receivers). The sterile purified aqueous extract can then be used to fill vials, for example, 1 cc. of the purified solution can be placed in each 3 cc. vial. The vialed hyaluronidase preparation can then be dried from a frozen state under vacuum (lyophilized). Depending on the concentration desired in each vial, it may be desirable to dilute the hyaluronidase preparation before vialing. This can be done with distilled water. Also, stabilizing agents can be added if desired.

In order to more fully illustrate the present invention it is desired to set forth the following specific example.

*Example*

Frozen beef testes (held at −60° C. in the frozen state) are thawed in warm water sufficiently to permit splitting and capsule removal. The decapsulated organs are again frozen to permit grinding in a comminuting machine to a 1/16 inch mesh size. During this procedure the tissue is not allowed to rise above a maximum of about 2° C. The comminuted tissue is extracted over a 2 hour period with an equal weight of 0.1 normal acetic acid at a temperature of 0° C. The extract is separated in a Sharples refrigerated centrifuge at 0° C. and the residue discarded. The extract separated in the Sharples centrifuge is dialyzed against three changes of distilled water at 0° C. The dialyzate is discarded and the extract within the membrane is separated from the copious precipitate of inert protein material by filtration. The filtrate is assayed by the Dorfman turbidimetric method and the nitrogen content per cc. is determined by a standard assay technique. The purity index at this point will ordinarily be between about 800 to 1200 TRU/mg. N. In a specific typical run, the purity was 1,125 TRU/mg. N. The filtrate, after assaying, is then diluted with distilled water so that the solution will contain about 200 Dorfman TRU per cc. This solution is then Seitz-filtered into a sterile receiver, and vialed, 1 cc. per 3 cc. vial. The vials are dried from the frozen state under vacuum. The lyophilized vial will contain about 150 Dorfman TRU and considerably less than .05 mg. nitrogen. From 1300 to 1800 of these vials can be prepared from 1 lb. of beef testes. Stability determniations on the vialed hyaluronidase preparation indicate no loss of activity in six months.

While in the foregoing specification this invention has been set forth in considerable detail for purpose of illustration, it will be apparent to those skilled in the art that many of the details set forth can be varied widely without departing from the spirit of the invention.

We claim:

1. In a process for preparing hyaluronidase wherein testicular tissue is extracted with water to obtain a crude aqueous extract of hyaluronidase, the step of dialyzing said crude aqueous extract of hyaluronidase against water to remove the inorganic body salts from said extract and to precipitate the bulk of the inert protein contaminants therein.

2. In a process for preparing hyaluronidase wherein comminuted testicular tissue is extracted with acidified water to obtain a crude aqueous extract of hyaluronidase, the step of dialyzing said crude aqueous extract of hyaluronidase against water to remove the inorganic body salts from said extract and to precipitate the bulk of the inert protein contaminants therein.

3. The process step of claim 2 in which said testicular tissue is beef testes.

4. In a process for preparing hyaluronidase, the steps of extracting comminuted testicular tissue with acidified water to obtain an aqueous extract of hyaluronidase, separating the tissue residue from said extract, and dialyzing the aqueous extract thus obtained against water to remove the inorganic body salts from said extract and to precipitate the bulk of the inert protein contaminants therein.

5. The process steps of claim 4 in which said testicular tissue is beef testes.

6. In a process for preparing hyaluronidase, the steps of extracting comminuted testicular tissue with water acidified to a pH between about 4.0 to 4.7 to obtain a crude aqueous extract of hyaluronidase, separating the tissue residue from said crude aqueous extract, and thereafter subjecting the crude aqueous extract thus obtained to dialysis against water to remove the inorganic salts from said extract and to precipitate the bulk of the inert protein comtaminants therein.

7. In a process for preparing hyaluronidase, the steps of extracting comminuted testicular tissue with an extracting solvent consisting of water acidifing to a pH between about 4.5 to 4.7 to obtain an aqueous extract of hyaluronidase, separating the tissue residue from said aqueous extract, and thereafter dialyzing the aqueous extract thus obtained against water to remove the inorganic body salts from said extracts and to precipitate the bulk of the inert protein contaminants therein.

8. The process steps of claim 7 in which said testicular tissue is beef testes.

9. In a process for preparing hyaluronidase, the steps of extracting comminuted testicular tissue with water acidified with acetic acid to a pH between about 4.5 to 4.7 to obtain an aqueous extract of hyaluronidase, separating the tissue residue from said aqueous extract, and thereafter dialyzing the aqueous extract thus obtained against water to remove the inorganic body salts from said extract and to precipitate the bulk of the inert protein contaminants therein.

10. In a process for preparing hyaluronidase, the steps of extracting comminuted testicular tissue with an extracting solvent consisting of water acidified with acetic acid to a pH between about 4.5 to 4.7 to obtain an aqueous extract of hyaluronidase, said extracting solvent being employed in an amount of about ½ to 2 parts by weight of solvent to each part by weight of tissue, separating the tissue residue from said aqueous extract, and next subjecting the aqueous extract thus obtained to dialysis against water to remove the inorganic body salts from said extract and to precipitate the bulk of the inert protein contaminants therein, all of said steps being carried out at a temperature not substantially over 5° C.

11. The process steps of claim 10 in which said testicular tissue and said extracting solvent are contacted for a period less than 4 hours.

12. The process steps of claim 10 in which said extracting solvent is employed in an amount of around 1 part by weight of solvent to each part by weight of said tissue, and all of said steps are carried out at a temperature of around 0° C.

13. In a process for preparing hyaluronidase wherein testicular tissue is extracted with water to obtain a crude aqueous extract of hyaluronidase, the steps of dialyzing said crude aqueous extract of hyaluronidase against water to remove the inorganic body salts from said extract, while at the same time rendering non-dialyzable inert protein contaminants insoluble, and removing said insoluble contaminants from the dialyzed solution.

References Cited in the file of this patent

Modinaveitia et al.: Biochem. Jour. 34 (1940), pages 625–631.

Modinaveitia et al.: Biochem. Jour. 35 (1941), pages 447–452.